United States Patent
Jain et al.

(10) Patent No.: US 12,346,891 B2
(45) Date of Patent: Jul. 1, 2025

(54) IDENTIFYING TRANSACTION PROCESSING RETRY ATTEMPTS BASED ON MACHINE LEARNING MODELS FOR TRANSACTION SUCCESS

(71) Applicant: PAYPAL, INC., San Jose, CA (US)

(72) Inventors: Aditya Jain, Morgan Hill, CA (US); Piyush Neupane, Hayward, CA (US); Yogesh Krishna Kandlur, Fremont, CA (US); Visak Chockalingom, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 159 days.

(21) Appl. No.: 17/369,537

(22) Filed: Jul. 7, 2021

(65) Prior Publication Data

US 2023/0012458 A1    Jan. 12, 2023

(51) Int. Cl.
 *G06Q 20/02* (2012.01)
 *G06N 5/04* (2023.01)
 (Continued)

(52) U.S. Cl.
 CPC .......... *G06Q 20/356* (2013.01); *G06N 5/04* (2013.01); *G06N 20/20* (2019.01); *G06Q 20/02* (2013.01);
 (Continued)

(58) Field of Classification Search
 CPC ........ G06Q 20/356; G06Q 20/20; G06Q 5/04; G06Q 20/02; G06Q 30/0283; G06Q 40/02; H04L 63/0853
 (Continued)

(56) References Cited

U.S. PATENT DOCUMENTS 11,900,387 B2 * 2/2024 Braun ................... G06Q 20/405
2016/0203484 A1 * 7/2016 Blinov ............... G06Q 20/4037
705/44

(Continued)

FOREIGN PATENT DOCUMENTS

CN     110264358 A  *  9/2019  ............. G06Q 20/10
RU       2602394 C2  * 11/2016  ............. G06Q 20/02
WO  WO-2017031469 A1 *  2/2017  ............. G06Q 20/12

OTHER PUBLICATIONS

Title: Machine Learning for Fraud Detection in E-Commerce: A Research Agenda Authors: Niek Tax et al. Date: Jul. 5, 2021 (Year: 2021).*

*Primary Examiner* — Bennett M Sigmond
*Assistant Examiner* — Yongsik Park
(74) *Attorney, Agent, or Firm* — Haynes and Boone, LLP

(57) ABSTRACT

There are provided systems and methods for identifying transaction processing retry attempts based on machine learning models for transaction success. A service provider, such as an electronic transaction processor for digital transactions, may detect a failure of data processing for a transaction when processed with a separate data processing system, such as a card processing system for payment cards. In order to minimize cost and wasted resources for retrying transactions that are likely to further fail, a machine learning model may be implements that generates a predictive score for whether a failed transaction is likely to be successful if retried with the data processing system. The predictive score may be used to predict a probability of success, which may then be used with a cost function to determine a cost to retry the failed transaction and a cost to stop a retry of the failed transaction.

20 Claims, 6 Drawing Sheets

(51) Int. Cl.
 *G06N 20/20* (2019.01)
 *G06Q 20/34* (2012.01)
 *G06Q 30/0283* (2023.01)
 *G06Q 40/02* (2023.01)
 *H04L 9/40* (2022.01)

(52) U.S. Cl.
 CPC ......... *G06Q 30/0283* (2013.01); *G06Q 40/02* (2013.01); *H04L 63/0853* (2013.01)

(58) Field of Classification Search
 USPC .......................................................... 705/44
 See application file for complete search history.

(56) References Cited

U.S. PATENT DOCUMENTS

| | | | |
|---|---|---|---|
| 2018/0219830 A1* | 8/2018 | O'Brien | H04L 61/5007 |
| 2020/0134628 A1* | 4/2020 | Jia | G06N 20/00 |
| 2020/0327552 A1* | 10/2020 | Seshan | G06Q 20/425 |
| 2021/0406896 A1* | 12/2021 | Chaturvedi | G06Q 20/405 |
| 2022/0122076 A1* | 4/2022 | Braun | G06Q 40/02 |
| 2024/0152833 A1* | 5/2024 | Raj Susairaju | G06Q 10/0637 |
| 2024/0311696 A1* | 9/2024 | Mukhopadhyay | G06Q 20/14 |

\* cited by examiner

IDENTIFYING TRANSACTION PROCESSING RETRY ATTEMPTS BASED ON MACHINE LEARNING MODELS FOR TRANSACTION SUCCESS

TECHNICAL FIELD

The present application generally relates to retrying failed data processing operations and transactions, and more particularly to machine learning models that determine whether to retry a failed data processing attempt based on likelihood of success and a cost function for retrying the data processing.

BACKGROUND

Online service providers may provide services to different users, such as individual end users, merchants, companies, and other entities. For example, online transaction processors may provide electronic transaction processing services. When providing these services, the service providers may provide an online platform that may be accessible over a network, which may be used to access and utilize the services provided to different users. During electronic transaction processing via the online platform, the transaction processor's platform may interact with a separate platform that may provide data processing services for financial instruments. For example, an acquirer card processing system and platform may provide a card processor gateway and network to process payment card data, such as a credit card number and the like. This may be used when a digital transaction is received by an online transaction processor. However, data processing requests between the two systems may fail at time, such as due to network communication issues, timeouts during decision service use, and other errors that may occur with data processors. If all failed data processing requests are retried even when the requests may be unsuccessful, the transaction processor may waste computing and network resources. However, without retrying some data processing requests, the transaction processor may, decline transaction due to systems not being available or incomplete data and or insufficient balance.

Figure 1:
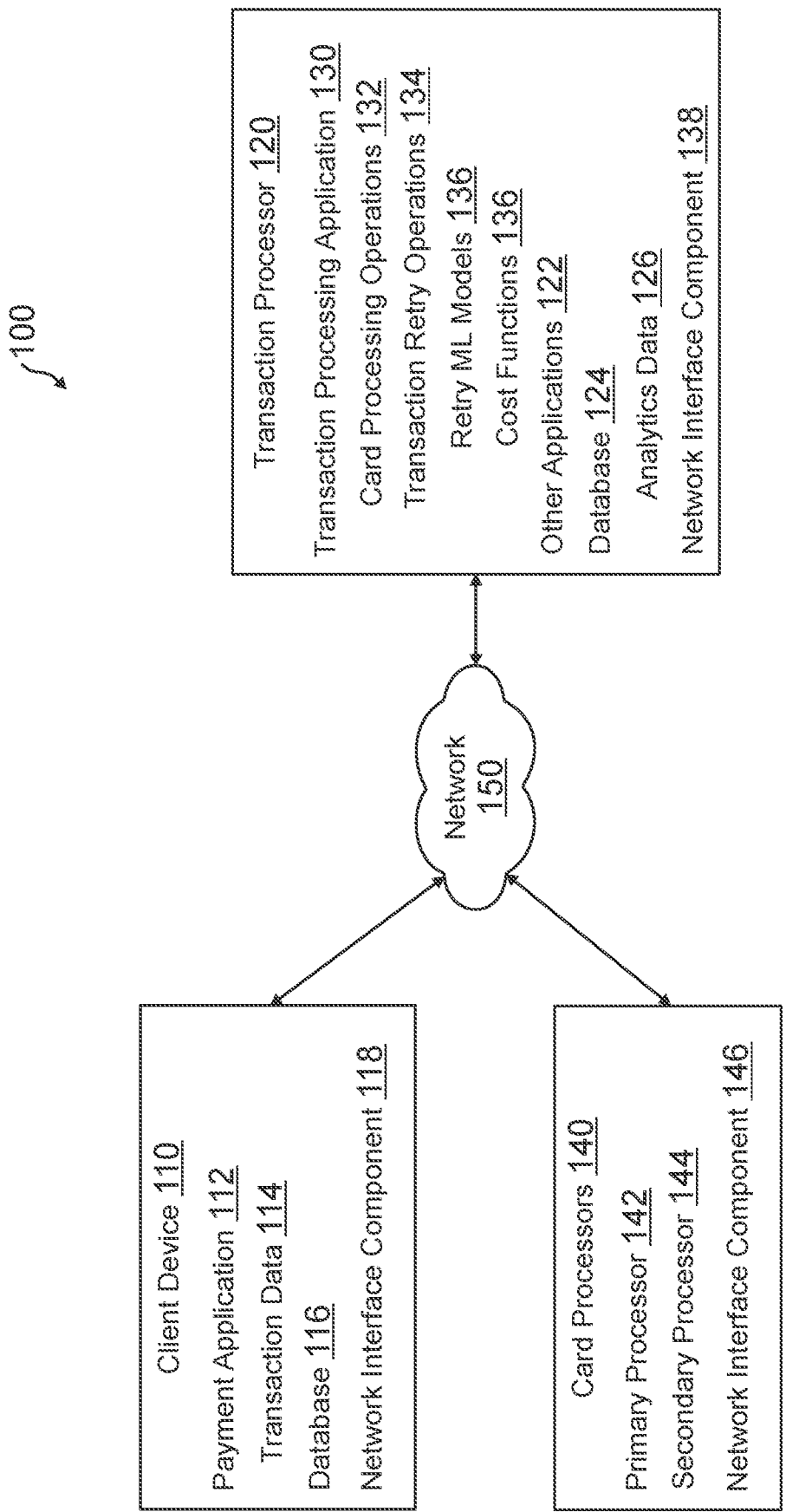
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for identifying transaction processing retry attempts based on machine learning models for transaction success. Systems suitable for practicing methods of the present disclosure are also provided.

In network communications, such as between online platforms and systems for service providers and end users' client devices, electronic platforms and computing architecture may provide computing services to users and computing devices. For example, online transaction processors may provide computing and data processing services for electronic transaction processing between two users or other entities (e.g., groups of users, merchants, businesses, charities, organizations, and the like). In order to assist in processing transactions for online transaction processors, payment networks and platforms may be utilized to process financial data and instruments. For example, an acquirer card processing system may interact with the transaction processor, as well as issuer payment systems, to process payment card data, such as credit or debit card data, when received with a transaction. The acquirer card processing system may receive card data, as well as any required transaction, user, or entity data (e.g., an amount, payee account, transaction timestamp or data, and the like). However, during certain transaction processing, a failure may occur. For example, network communications may encounter an error where all or a part of the data is not properly transmitted to the card processing system. At other times, a data processing failure, such as a timeout of a decision service or failure to process certain data, may occur at the card processing system. Each of these may therefore cause processing of the transaction and card data to fail and therefore not be processed by the card processing system when interacting transaction processor to process data and cause a payment to be issued. Thus, certain data, network communications, and/or data processing operations may cause a transaction processing failure between the transaction processor and the card processing system.

The transaction processor may execute a retry operation with the same transaction and card data to attempt to process the data with the card processing system. However, in some cases, only a small amount of retries may be successful, such as ~10% or less. Further, retries may have an associated cost due to the data processing and resources used, as well as the network communications and additional request to the card processing network. As such, the transaction processor may utilize a machine learning (ML) model trained to predict whether a retry of a transaction and card data processing request (e.g., based on a transaction received for electronic transaction processing) may be successful if retried and resubmitted to the card processing system by the transaction processor. For example, the ML model may provide a predictive score on a likelihood of success to retry processing of the transaction with the card processing system (e.g., using the transaction and card data). The predictive output, such as the score, decision, or other value, may further be used with a cost function to determine whether to retry processing the transaction based on an underlying cost (e.g., due to the additionally consumed and used data processing operations and network communication resources). If a cost for attempting the retry is less than the cost for abandoning or preventing the retry, then the transaction processor may execute the retry of the failed transaction processing request and may resubmit or retry processing the transaction with the card processing system.

For example, a service provider may provide electronic transaction processing to users and entities through digital accounts, including consumers and merchants that may wish to process transactions and payments. The service provider may also provide computing services, including email, social networking, microblogging, media sharing, messaging, business and consumer platforms, etc. In order to establish an account, these different users may be required to provide account details, such as a username, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial or funding source information, including payment card (e.g., credit/debit card) information, bank account information, gift card information, benefits/incentives, and/or financial investments, which may be used to process transactions. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

Thus, an online transaction processor or other service provider may execute operations, applications, decision services, and the like that may be used to process transactions between two or more users or entities. However, errors in data processing operations and engines, network communications, and other transaction computing services may cause a transaction to fail to be properly processed between the transaction processor and a backend card processing gateway and network, such as an acquirer card processing system. In order to minimize processing costs and wasted processing and network resources, the transaction processing may use one or more intelligent ML or other artificial intelligence (AI) models and engines to predict retry success and cost. In order to train the ML models, training data for the ML models may be collected and/or accessed. The training data may correspond to past failed transactions, such as transaction processing failures for past transactions when processing was attempted with a card processing system. The training data may be specific to a certain card processing system (e.g., VISA®, MASTERCARD®, etc.) or may be across platforms. Additionally, the training data may include retry attempts and whether those retry attempts were successful or results in a further failure and retry of the processing was unsuccessful.

The training data for these transaction processing failures may include data regarding the underlying transaction, such as transaction, user, merchant, and other data for the requested transaction. The training data may also include financial source or instrument data, such as data associated with the payment card used to process the transaction, the payment network and network communications to transmit the payment card data to the card processing system, and/or data regarding a card processor and/or server system used with the card processing system to attempt processing of the transaction. In this regard, the card processing system may include a plurality of different card processors, such as a primary card processor and/or a secondary card processor. The primary card processor may be used for an initial transaction processing request, while the secondary card processor may be invoked during retry attempts. However, other card processors may also be used. As such, the training data may include a designation of the card processor that was used during the failure and/or retry attempt.

Thereafter, the transaction processors ML model trainer may perform feature extraction to extract features and/or attributes used to train the ML model. For example, training data features may correspond to those data features which allow for decision making by nodes of a ML model. In this regard, a feature may correspond to data that may be used to output a decision by a particular node, which may lead to further nodes and/or output decisions by the ML model. The features may be used to determine mathematical relationships based on the ML algorithm to generate predictions and other decision-making, such as a predictive score of whether a retry attempt may be successful or may further fail when retried with the card processing system. For example, the features may be associated with the transaction data, card or financial instrument data, card processing system and network communications, or the like. The training feature may then be used for training the ML model using a ML algorithm and a ML training process. The predictive score may be compared to a threshold to determine whether to execute a retry, or may use a cost function, as discussed herein. In various embodiments, the ML model may use a Light GBM model, an XG Boost model, a random forest model, or a tree-based algorithm model.

Once the ML model is trained, the ML model may then be deployed in a predictive system for predicting retry attempt success and/or whether to execute a retry of a failed transaction processing attempt of a transaction. In this regard, the ML model may also be deployed with a cost function, where the cost function uses the probability score (and/or a corresponding probability, likelihood, percentage of success/failure, or the like) to determine whether to execute a retry attempt of the failed transaction. For example, the cost function may calculate a cost of the retry attempt based on additional used computing and network communication resources and compare this retry attempt cost to a cost for preventing or abandoning the retry attempt. The cost for preventing or abandoning the attempt may consider the lost revenue in addition to the cost for the used computing and network communication resources. Both costs may consider the cost for being successful and unsuccessful with the retry attempt. Once deployed, the online transaction processors retry attempt engine and/or service, using the ML model and/or cost function, may then monitor for a failed transaction with a card processing system or other financial processing system.

Once a failure of a transaction processing attempt for a transaction occurs, the retry attempt engine may obtain data for the failure, such as transaction and/or financial instrument data (e.g., card data and any data associated with requesting processing of the card data with a card processing system). The retry attempt engine may then extract features and/or attributes used as input to the ML model, such as the retry success features and attributes used as input to an input layer and/or nodes of the ML model. The retry success engine may then provide the extracted features and/or attributes as input to the trained ML model. The ML model may then provide an output prediction or decision, such as a predictive score for retry success likelihood. In this regard, the predictive score may further correspond to a probability or likelihood (e.g., in percentage form or quantitative form usable with a cost function), which may allow comparison to other predictive scores, a threshold, and/or costs for executing or preventing the retry attempt.

After determining the predictive score, the predictive score may be used to determine whether to execute a retry of the failed transaction with the card processing system. In this regard, the predictive score may be compared to a threshold score or likelihood of success, which may be required to be met or exceed to execute the retry. In other embodiments, the cost function may be implements with the predictive score to determine a cost to retry processing of the transaction and a cost to abandon the transaction and/or prevent the retry attempt of the transaction. If the cost to retry processing is less than (or equal too) the cost to abandon and/or prevent processing of the transaction in a subsequent retry attempt, then the retry attempt of the transaction may be executed with the card processing system. However, if the cost of retrying the transaction is predicted to be higher than the cost of abandoning the transaction and/or preventing the retry attempt, then the transaction may be identified as failed and further retries of processing may not be executed.

Thus, the online transaction processor may determine whether to conserve processing resources and network communication bandwidth, usage, and resources using a predictive model. This reduces processing time, cost, and resource usage with large computing systems, thereby providing improved data processing systems. This also reduces processing loads and network communication consumption for card processing systems, gateways, and network, which further improves performance of such data processing and computing systems. Further, the online transaction processor may monitor success and/or failure of the retry attempts for failed transactions with the card processing system. Based on the success/failures of the retried transaction and the performance of the ML model, the transaction processor may update, retrain, and/or continuously train the ML model. The transaction processor may also update the cost function based on these success/failures, which may further be used to tune retry attempt predictions and provide improved ML model performance.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110, a transaction processor 120, and card processors 140 in communication over a network 150. Client device 110 may be utilized by a user to interact with transaction processor 120 over network 150, where transaction processor 120 may provide various computing services, data, operations, and other functions over network 150. In this regard, client device 110 may perform activities with transaction processor 120 for electronic transaction processing using a financial instrument, such as a payment card (e.g., credit or debit card). Transaction processor 120 may receive transaction data and may interact with card processors 140 to process the financial instrument with the transaction. Processing of a transaction with card processors 140 may fail, which may cause transaction processor 120 to determine whether to retry transaction processing with card processor 140 using one or more ML models and/or cost functions.

Client device 110, transaction processor 120, and card processors 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with transaction processor 120 and card processors 140. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains a payment application 112, a database 116, and a network interface component 118. Payment application 112 may correspond to executable processes, procedures, and/or applications with associated hardware. In other embodiments, client device 110 may include additional or different modules having specialized hardware and/or software as required.

Payment application 112 may correspond to one or more processes to execute software modules and associated components of client device 110 to provide features, services, and other operations for a user over network 150, which may include electronic transaction processing features with transaction processor 120. In this regard, payment application 112 may correspond to specialized software utilized by a user of client device 110 that may be used to access a website or application (e.g., mobile application, rich Internet application, or resident software application) that may display one or more user interfaces that allow for interaction with transaction processor 120, for example, to process transactions. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 150, including retrieving website information, presenting the website information to the user, and/or communicating information to the website. However, in other embodiments, payment application 112 may include a dedicated application of transaction processor 120 or other entity (e.g., a merchant) for transaction processing via transaction processor 120.

Payment application 112 may be associated with account information, user financial information, and/or transaction histories for electronic transaction processing, including processing transactions using financial instrument or payment card data via card processors 140. Payment application 112 may be utilized to enter, view, and/or process items the user wishes to purchase in a transaction, as well as perform peer-to-peer payments and transfers. In this regard, payment application 112 may provide transaction processing for transaction data 114, such as through a user interface enabling the user to enter and/or view the items in transaction data 114 that the user associated with client device 110 wishes to purchase. Thus, payment application 112 may also be used by a user to provide payments and transfers to another user or merchant, which may include transmitting transaction data 114 to transaction processor 120. For example, transaction data 114 may include and/or utilize user financial information, such as credit card data, bank account data, or other funding source data, as a payment instrument when providing payment information to transaction processor 120 for the transaction. Additionally, payment application 112 may utilize a digital wallet associated with an account with a payment provider as the payment instrument, for example, through accessing a digital wallet or account of a user through entry of authentication credentials and/or by providing a data token that allows for processing using the account. Payment application 112 may also be used to receive a receipt or other information based on transaction processing. Further, additional services may be provided via payment application 112, including social networking, media posting or sharing, microblogging, data browsing and searching, online shopping, and other services available through transaction processor 120.

Client device 110 may further include a database 116 stored on a transitory and/or non-transitory memory of client device 110, which may store various applications and data and be utilized during execution of various modules of client device 110. Database 116 may include, for example, identifiers such as operating system registry entries, cookies associated with payment application 112 and/or other applications, identifiers associated with hardware of client device 110, or other appropriate identifiers, such as identifiers used for payment/user/device authentication or identification, which may be communicated as identifying the user/client device 110 to transaction processor 120. Moreover, database 116 may store transaction data 114 and/or transaction processing histories, or other information associated with transaction data 114 and processing the data with transaction processor 120.

Client device 110 includes at least one network interface component 118 adapted to communicate with transaction processor 120, card processors 140, and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Transaction processor 120 may be maintained, for example, by an online service provider, which may provide operations for use of service provided by transaction processor 120 including account and electronic transaction processing services. In this regard, transaction processor 120 includes one or more processing applications which may be configured to interact with client device 110 and/or card processors 140 to process transactions, which may include transaction data and financial instrument data. In various embodiments, processing of transactions may encounter failures with card processors 140, which may be retried based on intelligent decision-making by transaction processor 120. In one example, transaction processor 120 may be provided by PAYPAL®, Inc. of San Jose, CA, USA. However, in other embodiments, transaction processor 120 may be maintained by or include another type of service provider.

Transaction processor 120 of FIG. 1 includes a transaction processing application 130, other applications 122, a database 124, and a network interface component 128. Transaction processing application 130 may correspond to executable processes, procedures, and/or applications with associated hardware. In other embodiments, transaction processor 120 may include additional or different modules having specialized hardware and/or software as required.

Transaction processing application 130 may correspond to one or more processes to execute modules and associated specialized hardware of transaction processor 120 to provide service for account usage, digital electronic communications, electronic transaction processing, and the like. In this regard, transaction processing application 130 may correspond to specialized hardware and/or software used by a user associated with client device 110 to utilize one or more services for electronic transaction processing. Transaction processing application 130 may be used by a user associated with client device 110 to establish a payment account and/or digital wallet, which may be used to process transactions. In various embodiments, financial information may be stored to the account, such as account/card numbers and information. A digital token for the account/wallet may be used to send and process payments, for example, through an interface provided by transaction processor 120. The payment account may be accessed and/or used through a browser application/extension and/or dedicated payment application executed by client device 110 and engage in transaction processing through transaction processing application 130.

In various embodiments, transaction processing application 130 may receive transaction data 114 from client device 110, and process transaction data 114 using card processing operations 132. For example, card processing operations 132 may utilize transaction and financial instrument data (e.g., payment card data) from transaction data 114 to process the transaction with card processors 140. Transaction processing application 132 may process the transaction and may provide a transaction history to merchant device 120 for transaction authorization, approval, or denial. Transaction processing application 130 may further include messaging, social networking, media posting or sharing, microblogging, data browsing and searching, online shopping, and other services available through transaction processor 120.

However, during some transaction processing events and operations, card processing operations 132 may detect that a failure to process the transaction occurs, resulting in a transaction processing failure notification or alert. For example, processing of transaction data 114 may fail and card processing operations 132 may execute transaction retry operations 134 to determine whether to retry processing of the transaction for transaction data 114. In this regard, transaction retry operations 134 may include retry ML models 136 that may be used with cost functions 138 to determine whether to retry processing of the transaction.

Retry ML models 136 may be trained to provide a predictive output, such as a score, likelihood, probability, or decision, associated with whether retrying processing of the transaction may be successful with card processors 140. Further, cost functions 138 may be used to determine, based on the retry success likelihood or predictive score, whether a cost for the retry attempt of transaction process, as compared to a cost for preventing the retry attempt, indicates that the retry attempt should be executed.

For example, retry ML models 136 may include ML or neural network (NN) models trained using training data for past failed transactions and whether retry attempts of those failed transactions were successful, which may correspond to analytics data 126 stored by database 124. When building retry ML models 136, training data may be used to generate one or more classifiers and provide recommendations, predictions, or other outputs based on those classifications and an ML or NN model algorithm and/or trainer. The training data may be used to determine input features from analytics data 126, and whether those scores meet or exceed a threshold for retrying processing of a failed transaction. For example, ML models for retry ML models 136 may include one or more layers, including an input layer, a hidden layer, and an output layer having one or more nodes, however, different layers may also be utilized. As many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train ML models for retry ML models 136, for example, using feature or attribute extraction with analytics data 126 for past failed transactions, retry attempts of those transactions, and other related data.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for retry ML models 136 that attempt to classify whether a transaction that has failed transaction processing with card processors 140 should be retried and re-processed (e.g., a predictive score or probability). Thus, when M retry ML models 136 are used to perform a predictive analysis and output, the input may provide a corresponding output based on the classifications trained for retry ML models 136.

Thus, retry ML models 136 may be trained by using training data associated with analytics data 126 and a feature extraction of training features, such as features from past transaction processing failures and retry attempts of those failed transactions. By providing training data to train retry ML models 136, the nodes in the hidden layer may be trained (adjusted) such that an optimal output (e.g., a classification) is produced in the output layer based on the training data. By continuously providing different sets of training data and penalizing retry ML models 136 when the output of retry ML models 136 is incorrect, retry ML models 136 (and specifically, the representations of the nodes in the hidden layer) may be trained (adjusted) to improve its performance in data classification. Adjusting retry ML models 136 may include adjusting the weights associated with each node in the hidden layer. Thus, the training data may be used as input/output data sets that allow for retry ML models 136 to make classifications based on input attributes. The output classifications for an ML model trained may be classifications and/or predictions of retry attempt success for a transaction processing failure of a transaction.

Once trained, transaction retry operations 134 may utilize retry ML models 136 to determine whether to retry a failed transaction processing event with card processors 140 for a transaction. Card processing operations 132 may detect a transaction processing failure of the transaction and invoke transaction retry operations 134. Transaction retry operations 134 may extract features and attributes from transaction data 114 and other data for the transaction corresponding to transaction data 114 that was processed with card processor 140. Retry ML models 136 may then be invoked in order to generate a probability score or other predictive score/value for a likelihood of success when retrying processing of the transaction with card processors 140. In various embodiments, the retry attempt of transaction processing may utilize a different processor and/or computing system of card processors 140. For example, a primary processor 142 may have attempted processing of the transaction, which failed, and thus a secondary processor 144 may be designated for the retry attempt for processing of the transaction. Thus, additional features with primary processor 142 and/or secondary processor 144 may also be used for the input features and attributes.

Based on the predictive score or other predictive assessment or decision from retry ML models 136 with the failed transaction, cost functions 138 may be invoked to determine whether to retry processing of the transaction. Cost functions 138 may be used to determine a cost (e.g., processing cost, cost for use of processing and/or network resources, time cost, and the like) that may be incurred by retrying processing of the transaction, which may utilize a base cost incurred from the retry attempt and predictive score or probability for the retry attempt. Cost functions 138 may further be used to determine a cost for abandoning the transaction processing and/or preventing the retry attempt, which may use the incurred cost, the predictive score, and/or a lost revenue cost if processing the transaction is successful. If the cost for retrying processing with card processors 140 is less than, or equal to, the cost for not retrying processing of the transaction, transaction retry operations 134 may retry processing of the transaction with card processors 140. However, if not, a retry attempt for the transaction may be stopped from being executed.

In various embodiments, transaction processor 120 includes other applications 122 as may be desired in particular embodiments to provide features to transaction processor 120. For example, other applications 122 may include security applications for implementing server-side security features, programmatic client applications for interfacing with appropriate application programming interfaces (APIs) over network 150, or other types of applications. Other applications 122 may include server interface applications for an online server platform that output data to one or more devices. For example, other applications 122 may contain software programs, executable by a processor, including a graphical user interface (GUI) configured to provide interface data for display on devices.

Additionally, transaction processor 120 includes database 124. Database 124 may store various identifiers associated with client device 110. Database 124 may also store account data, including payment instruments and authentication credentials, as well as transaction processing histories and data for processed transactions. Database 124 may store financial information or other data generated and stored by transaction processing application 130. Database 124 may also include data and computing code, or necessary components for retry ML models 136 and/or cost functions 138 used by transaction retry operations 134 when determining whether to retry a failed transaction. Database 124 may also include analytics data 126, which may be used for training of retry ML models 136, adjusting of those models, and/or configuring cost functions 138.

In various embodiments, transaction processor 120 includes at least one network interface component 128 adapted to communicate client device 110, card processors 140, and/or other devices or server over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Card processors 140 may be maintained, for example, by an online financial services and instrument provider, such as a service provider that provides a financial instrument usable for payments during transaction processing. In this regard, card processors 140 includes one or more processors having data processing applications which may be configured to interact with transaction processor 120 to process transactions, which may include transaction data and financial instrument data (e.g., card data for a payment card). In various embodiments, processing of transactions may encounter failures when processing data with transaction processor 120. In one example, card processors 140 may be provided by VISA®, MASTERCARD®, AMERICAN EXPRESS®, DISCOVERY®, or the like. However, in other embodiments, card processors 140 may be maintained by or include another type of financial service provider including banks, loan or credit providers, and the like.

Card processors 140 of FIG. 1 includes a primary processor 142, a secondary processor 144, and a network interface component 146. Primary processor 142 and secondary processor 144 may correspond to executable processes, procedures, and/or applications with associated hardware. In other embodiments, card processors 140 may include additional or different modules having specialized hardware and/or software as required.

Primary processor 142 and secondary processor 144 may correspond to one or more processes to execute modules and associated specialized hardware of card processors 140 to process card data or other financial instrument data during electronic transaction processing, such as to provide a payment to another user, entity, and/or account. In this regard, primary processor 142 and secondary processor 144 may correspond to specialized hardware and/or software used to process card data for a payment, which may be made to an issuer and/or issuer computing and processing system for a user, entity, and/or account that is receiving a payment. In this regard, primary processor 142 and secondary processor 144 may correspond to an acquirer and/or acquirer card processing system and network, which may be used to issue payments based on received card data.

Primary processor 142 and secondary processor 144 may correspond to a payment network having processors used to process card data and provide payments to the corresponding issuer, which may then be resolved, and a payment may be provided to from the payers account and/or instrument to the payee account. Primary processor 142 may correspond to a card processor that is initially invoked by transaction processor 120 to process a transaction. As such, if primary processor 142 fails to process the transaction, secondary processor 144 may be invoked in order to process a retry attempt of the transaction after the transaction processing failure. Thus, primary processor 142 and/or secondary processor 144 may correspond to separate software and/or hardware processing systems, which may include the same or similar processing features or separate processing features that provide financial instrument processing for transactions.

In various embodiments, card processors 140 include at least one network interface component 146 adapted to communicate client device 110, transaction processor 120, and/or other devices or server over network 150. In various embodiments, network interface component 146 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
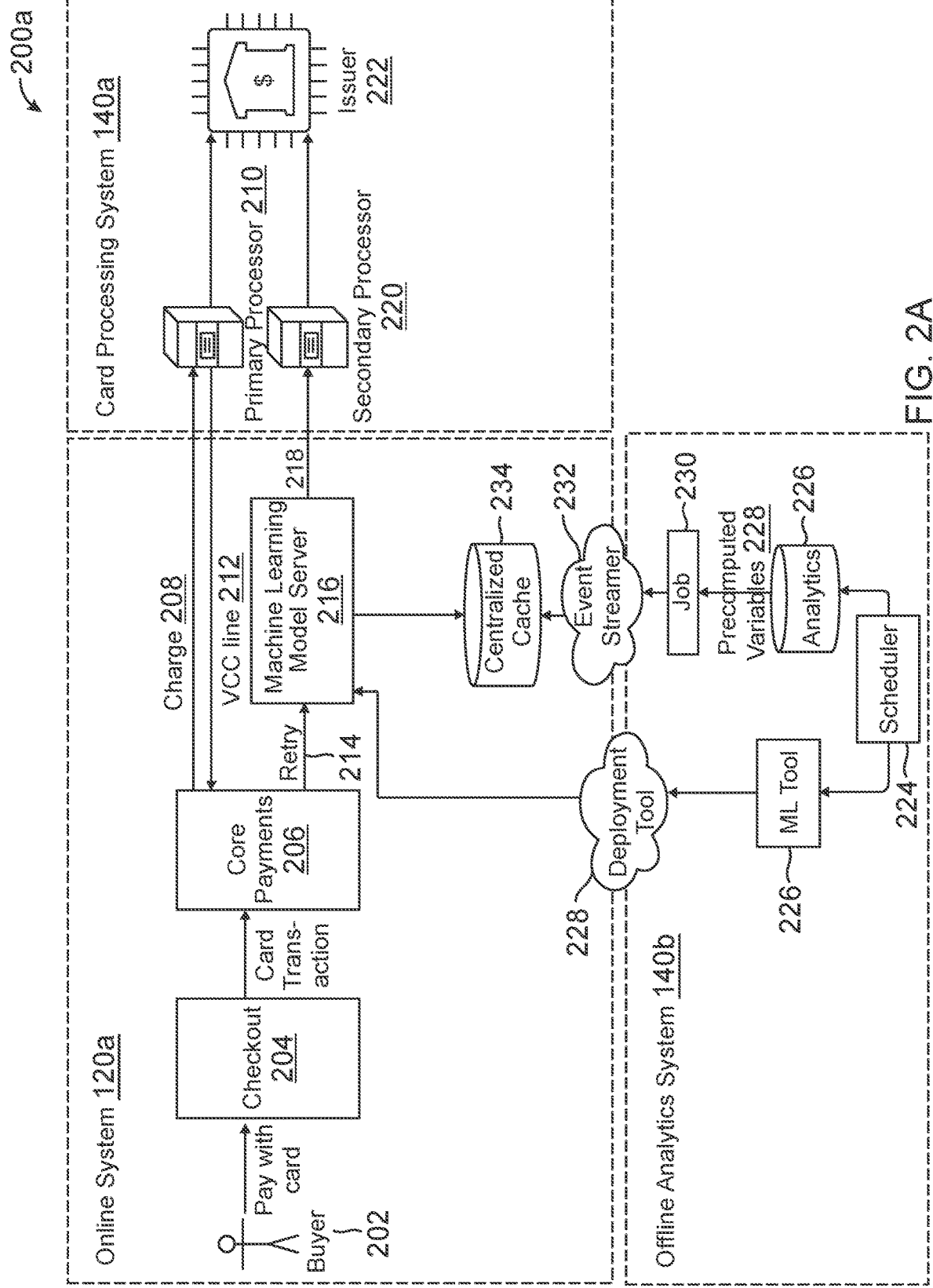
FIG. 2A is an exemplary computing environment for deploying a machine learning model to determine whether to retry failed electronic transaction processing requests, according to an embodiment.

FIG. 2A is an exemplary computing environment 200a for deploying a machine learning model to determine whether to retry failed electronic transaction processing requests, according to an embodiment. Computing environment 200a includes an online system 120a and an offline analytics system 120b corresponding to the systems of transaction processor 120 discussed in reference to system 100 of FIG. 1. Computing environment 200a further includes card processing system 140a corresponding to one or more card processors and platforms for an acquirer associated with card processors 140 discussed in reference to system 100. In this regard, client device 110 may be used by a buyer 202 in computing environment 200a in order to interact with online system 120a for electronic transaction processing.

In computing environment 200a, buyer 202 initially interacts with online system 120a by submitting a transaction for processing during a checkout 204. The transaction may include transaction data for processing of the transaction with a corresponding user, such as a corresponding merchant, business, third party, or other entity. The transaction data may further include items, cost or payment amount, fees and taxes, shipping/billing information, and/or financial instrument data (e.g., a payment card identifier and other information needed for payment processing). Checkout 204 may be provided by transaction processor 120 within online system 120a, such as by provide a digital shipping cart or other checkout interface and portal. Based on this data, a card transaction may be submitted to a core payments engine 206 of online system 120a. Core payments engine 206 may correspond to a payment processing application and platform, such as transaction processing application 130 in system 100. Core payments engine 206 may therefore be used for processing the transaction requested for processing by buyer 202, which may include payment card data for processing with card processing system 140*a*. In this regard, core payment engine 206 may request a charge 208 of the corresponding financial instrument or payment card data with a primary processor 210 for card processing system 140*a*. If successful, primary processor 210 of card processing system 140*a* may issue a payment from an account and/or financial instrument for buyer 202 (e.g., the payer for the transaction) to an issuer 222 for resolution with a corresponding payee account.

However, with charge 208, an error in data processing, a system or component of primary processor 210, a network communication of card data for charge operation 208, or the like may occur. Thus, primary processor 210 may fail to process the card data and corresponding transactions, for example, to issue the payment from the account and/or financial instrument for buyer 202 to issuer 222. As such, a decline notification 212 may be issued back to core payments engine 206. Core payments engine 206 may then execute a retry determination component and/or application, which may determine a likelihood or probability of success of retrying charge 208 and/or a retry attempt of the underlying transaction and financial instrument data with card processing system 140*a*. For example, a retry request 214 may be issued to a ML model server 216, which may determine whether to retry charge 208 and/or a retry attempt of the underlying transaction and financial instrument data with card processing system 140*a*. If ML model server 216 predicts a retry success 218 for retry request 214 or has a cost that indicates retry request 214 should be executed based on retry success 218, retry request 214 may be performed with secondary processor 220. Secondary processor 220 may receive the transaction and/or financial instrument data, which may then be processed. If successful, the payment may be issued to issuer 222; however, if not, a further failure of transaction processing may be provided by secondary processor 220 back to online system 120*a* for ML model and/or cost function adjustment.

Prior to executing ML model server 216 with the transaction and financial instrument data from buyer 202, one or more ML models may be trained for ML model server 216. For example, an offline analytics system 120*b* may be used for ML model system. Offline analytics system 120*a* of transaction processor 120 may include a schedule 224 that performs job scheduling for training, adjusting, retraining, and/or continually training the ML models. For example, a monthly or other time period job may be requested for execution by ML tool 226, which may be used to train one or more ML models using training data and one of a Light GBM model, an XG Boost model, a random forest model, or a tree-based algorithm model, however, other ML or NN algorithms and/or trainers may instead be used. Once trained, a deployment tool 228 may be used to deploy the ML model with ML model server 216. Deployment tool 228 may perform deployment testing and deployment at scheduled jobs to ensure proper deployment and execute of the ML model with ML model server 216.

Further, variable for the ML model, a threshold requirement for a predictive score, and/or a cost function having variables and/or coefficients in variable functions may be deployed with the ML model to determine costs with performing or declining to perform retry request 214. In this regard, analytics 226 may be used to determine precomputed variables 228 during a processing job executed by scheduler 224 to updating and adjusting the cost function. The processing job with analytics 226 with precomputed variables 228 may be executed more often, such as hourly or daily, to adjust precomputed variables 228 as changes to data processing and network resource costs change (e.g., depending on available processing server load, processing compute availability, processing times, network bandwidth or resource availability, etc.). Precomputed variables 228 may be deployed using a job 230 with an event streamer 232. Event streamer 232 may provide precomputed variables 228 to a centralized cache 234, which may make accessible to ML model server 216 during intelligent predictive services for retry success and whether to perform a retry attempt (e.g., retry request 214).

Figure 2B:
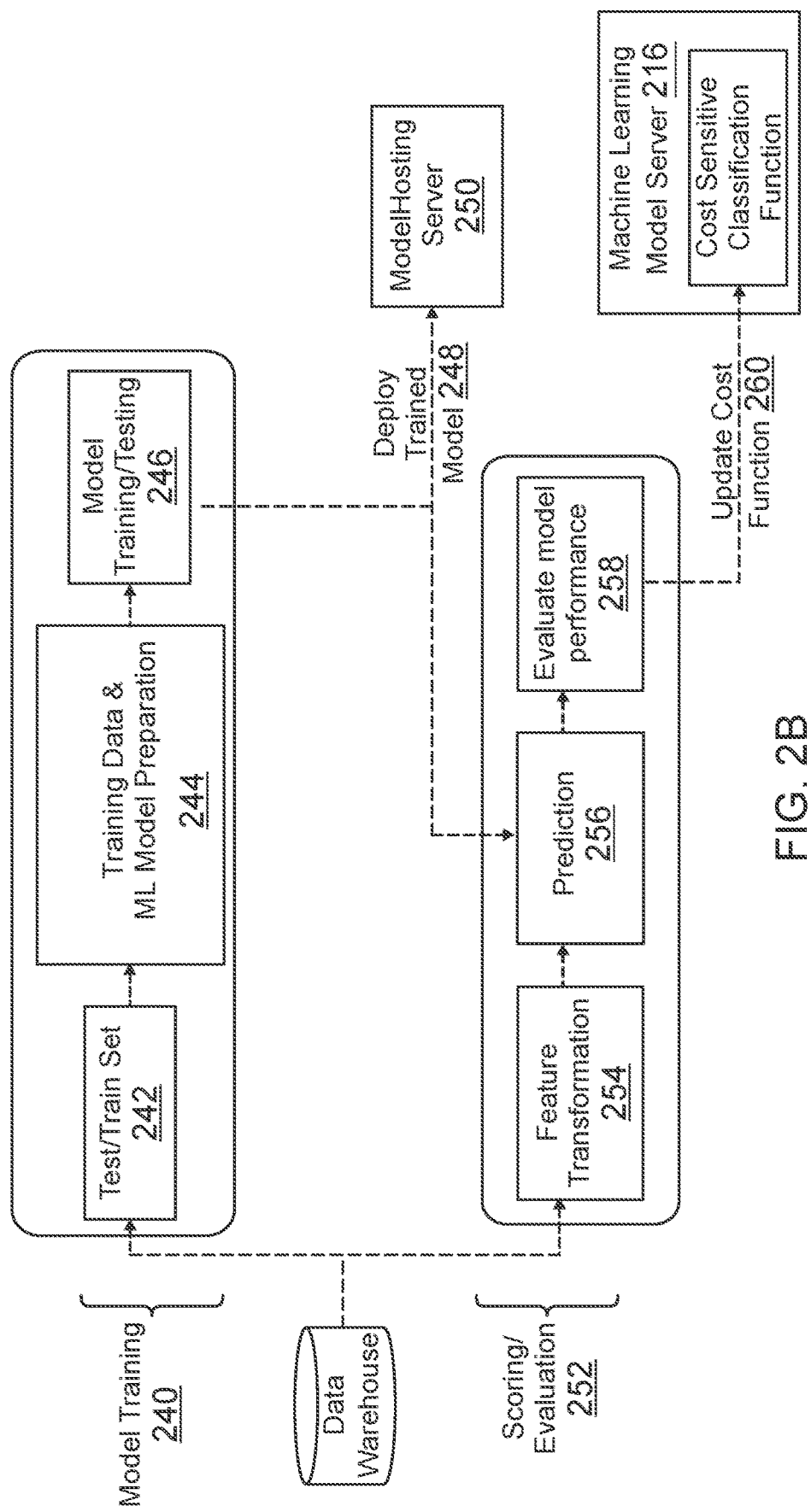
FIG. 2B is an exemplary block diagram of data used to train a machine learning model for predicting whether to retry a failed electronic transaction processing request, according to an embodiment.

FIG. 2B is an exemplary block diagram 200*b* of data used to train a machine learning model for predicting whether to retry a failed electronic transaction processing request, according to an embodiment. Diagram 200*b* includes analytics 226 that may be processed by transaction processor 120 for training of ML models discussed in reference to system 100 of FIG. 1. In this regard, transaction processor 120 may execute a model training 240 for an ML model and a scoring/evaluation 252 for model performance of the ML model.

In this regard, model training 240 may be used for ML model training and deployment within a ML engine and system for predicting retry attempt success for failed transactions and/or whether to execute the retry attempt with the failed transaction processor and a payment network and gateway for a corresponding financial instrument. In this regard, model training 240 includes a test/train set 242 corresponding to training data and corresponding features or attributes of training the ML model. In this regard, training data and ML model preparation 244 may be executed by model training 240 with test/train set 242 to prepare the training data, such as by performing feature extraction and/or transformation of data features from test/train set 242. These input data features and/or attributes may correspond to retry success features and other attributes from analytics 226. For example, retry success features may include data parameters in data tables and/or logs for 1) Card attributes 2) Processor related attributes 3) Merchant related attributes 4) Customer related attributes, including segments 5) Tokenization related attributes 6) Network routing attributes 7) Responses from processors. In this regard, the retry success features and/or attributes that are extracted may be associated with network data transmissions and/or network tokens for data, acquiring and/or issuing bank information, card or financial instrument processors and identification, merchant information including merchant codes and/or identification, financial instrument or card information, routing information for bank and/or credit accounts, and/or transaction information for items, costs, taxes or fees, and the like that may be included with the transaction.

After feature extraction and/or transformation, training data and ML model preparation 244 may perform cross validation, hyperparameter tuning, model selection, and the like for training an ML model. Once the training data and ML model algorithm have been prepared, model training/testing 246 may be performed. The ML model may be trained using the extracted features and ML algorithm, such as a Light GBM model, an XG Boost model, a random forest model, or a tree-based algorithm model, although other ML or NN algorithms and techniques may also be used. Model training/testing 246 may also include feedback loops and tuning by a data scientist, which may allow for more accurate predictions. Once trained, deploy trained model 248 may be executed to deploy the ML model in a model hosting server 250, such as a ML model server 216 from system environment 200*a* in FIG. 2A.

Scoring/evaluation 252 may then be used for determining predictive scores and other decisions or probabilities of likelihood that a retry attempt of a failed transaction may be successful. In this regard, when receiving a transaction that has resulted in a transaction processing failure, scoring/evaluation 252 may perform feature transformation 254 for the data, such as based on analytics 226 and corresponding input features for the failed transaction. Feature transformation 254 may then be used with the ML model from model hosting server 250 to generate a prediction 256, which may correspond to a predictive score or probability that retrying the failed transaction may result in a success. Prediction 256 may be used for an evaluate model performance operation 258, which determines if the prediction by the ML model was correct (e.g., if the retry attempt of the failed transaction was successful). This may also utilize a cost function to determine whether to execute the retry attempt of the failed transaction, such as by comparing costs to execute the retry attempt against costs to decline or abandon the retry attempt. Based on the ML model's performance, an update cost function operation 260 may be performed to change coefficients and variables of a corresponding cost function, thereby tuning predictive services. Thus, with ML model server 216, the cost function may be updated when utilized with the ML model hosted by model hosting server 250.

Figure 3:
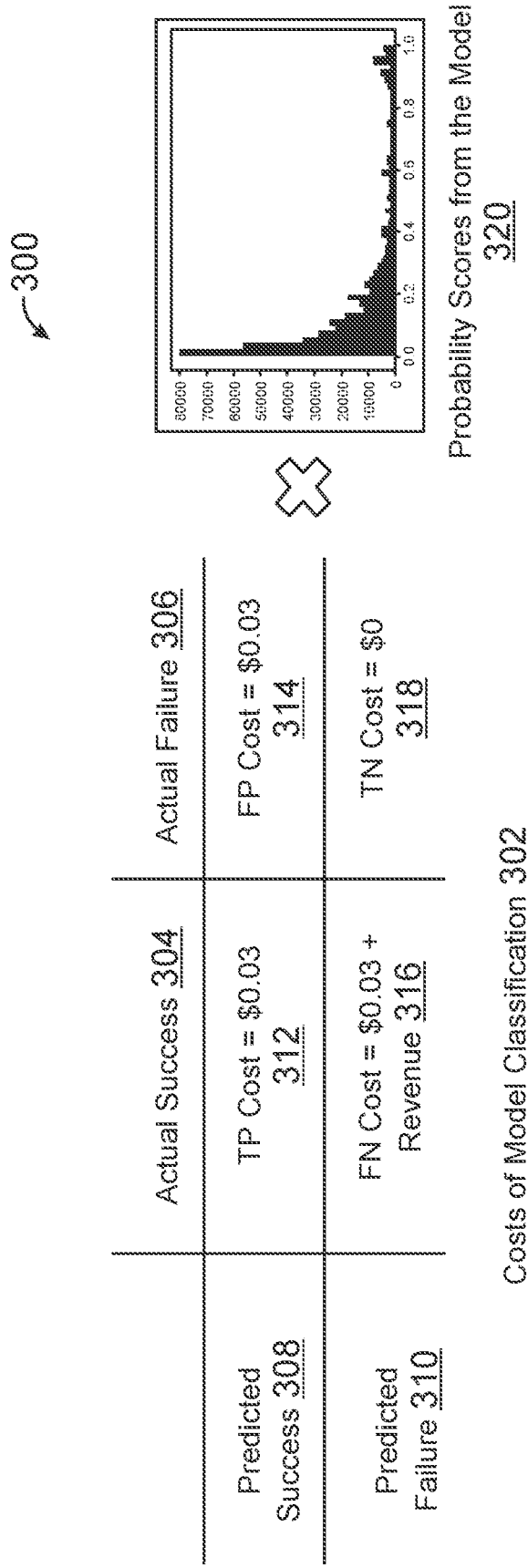
FIG. 3 is an exemplary diagram of a cost function that is used with a machine learning model for predicting whether to retry a failed transaction processing event, according to an embodiment.

FIG. 3 is an exemplary diagram 300 of a cost function that is used with a machine learning model for predicting whether to retry a failed transaction processing event, according to an embodiment. Diagram 300 includes costs of model classification 302 that may be performed by transaction processor 120 discussed in reference to system 100 of FIG. 1. In this regard, transaction processor 120 may use costs of model classification 302 to determine whether to execute a retry attempt of a failed transaction with a backed processing gateway and/or network, such as a card processing system.

Costs of model classification 302 utilize two columns for an actual success 304 and an actual failure 306 to plot costs in a chart for a predicted success 308 and a predicted failure 310. Actual success 304 and actual failure 306 correspond to retry attempts for a failed transaction that are actually successful when retried or actually fail again when retried, respectively. Predicted success 308 and predicted failure 310 correspond to outputs of a ML model trained for predicting retry success of a failed transaction, such as with a card processing system. In this regard, predicted success 308 and predicted failure 310 correspond to predictions for retry attempts for a failed transaction and whether those may be successful or may again fail when retried, respectively. Thus, when predicted success 308 results in actual success 304, a true positive 312 is shown in the corresponding chart cell for costs of model classifications 302. However, when predicted success 308 results in actual failure 306, a false positive 314 is shown the corresponding chart cell. For predicted failure 310, when actual success 304 results, a false negative 316 is shown in the corresponding chart cell, while predicted failure 310 resulting in actual failure 306, a true negative 318 is shown in the corresponding chart cell.

Each cell in costs of model classification 302 has a corresponding cost. For example, a cost, or "C", may be incurred from an assessment fee and/or usage of processing and network resources when requesting processing of the retry attempt. Cost may be incurred due to assessment by the backend processing gateway and/or payment network, such as the card processing system, as well as any lost data processing and/or network resources, time spent in processing the retry attempt of the failed transaction, and the like.

In this regard, a cost is shown as $0.03 in diagram 300, although other amounts may also be incurred based on the assessment and/or used computing resources and time. A revenue in false negative 316 may also include a cost from lost revenue due to preventing a retry of a transaction that instead would have success if retried. For example, a revenue may include some percentage of a payment amount for the transaction, total payment volume, or the like. Further, when calculating each of true positive 312, false positive 314, false negative 316, and true negative 318, the costs may be multiplied by, or otherwise adjusted using, probability scores from the model 320, or "yprob." Probability scores from the model 320 may be the output of the corresponding ML model trained for predictive scores for retry success of failed transactions.

For example, in order to minimize the cost of misclassification and retry attempts for a failed transaction than end in further failure, as well as maximize retry attempts that are cost effective at being retried, a cost function may be implemented. The following equation may be used to determine a cost to retry a failed transaction (e.g., executing and processing a retry attempt) and a cost for stopping or abandoning retrying of the failed transaction (e.g., preventing the retry attempt), where C is cost and yprob is a predicted probability score or likelihood determined from the ML model.

$$\text{Expected cost of retrying } (e1) = C(\text{true positive } 312)$$
$$*yprob + C(\text{false positive } 314)*(1-yprob)$$

$$\text{Expected cost of stopping a retry } (e0) = C(\text{false negative } 316)*yprob + C(\text{true negative } 318)*(1-yprob)$$

Equation 1:

Thereafter, e1 is compared to e0 to determine if a retry attempt of a failed transaction should proceed. For example, if e1<e0 then the failed transaction may be marked for retrying and a retry attempt of the failed transaction may be executed. However, if not, the failed transaction may not be retried, further processing may be stopped, and the transaction may be marked as failed. Further, when e1=e0, the system may be configured to retry or not retry, depending of system preferences.

Figure 4:
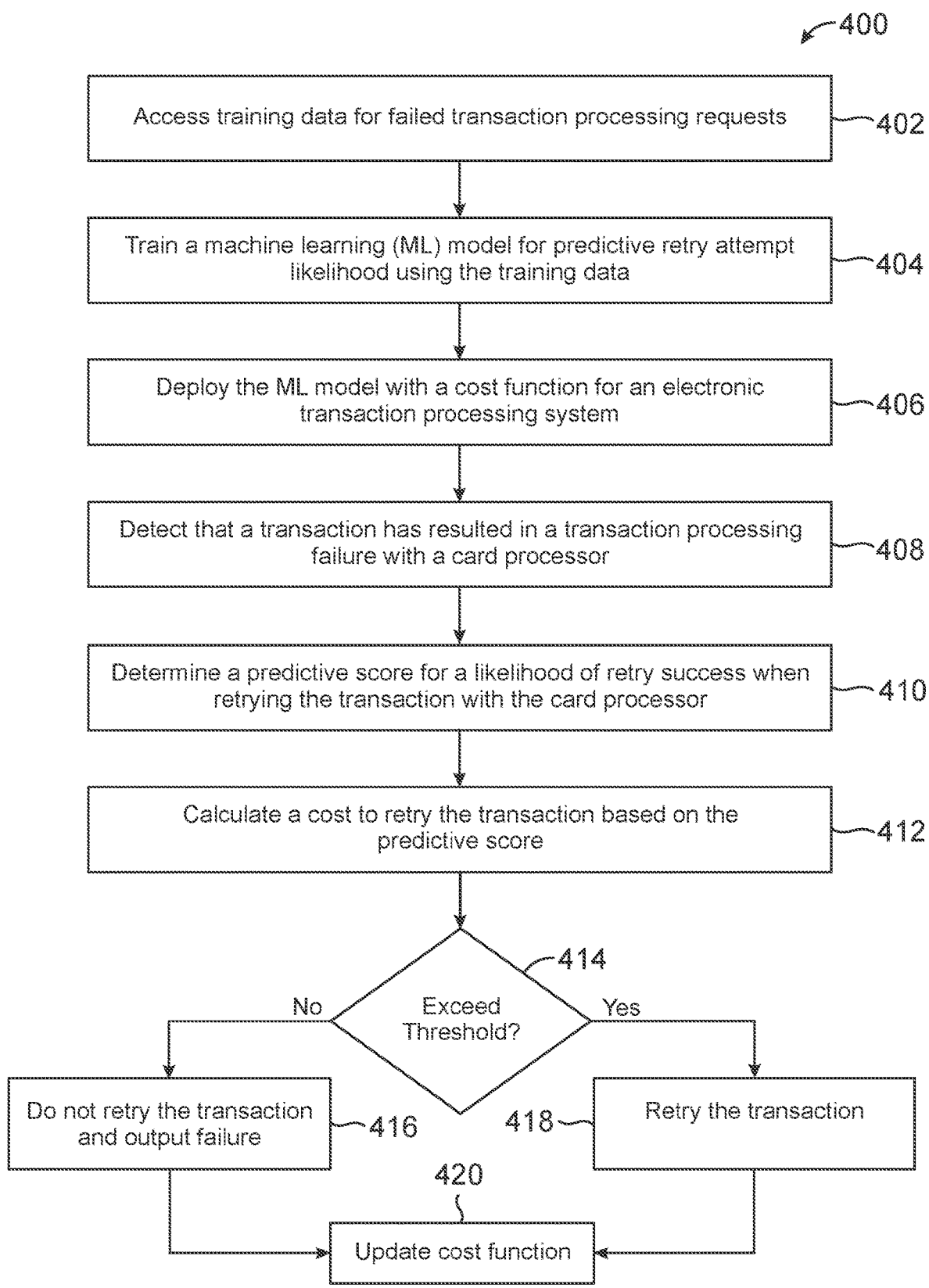
FIG. 4 is a flowchart for identifying transaction processing retry attempts based on machine learning models for transaction success, according to an embodiment.

FIG. 4 is a flowchart for identifying transaction processing retry attempts based on machine learning models for transaction success, according to an embodiment. Note that one or more steps, processes, and methods described herein of flowchart 400 may be omitted, performed in a different sequence, or combined as desired or appropriate.

At step 402 of flowchart 400, training data for failed transaction processing requests is accessed. The training data may include past transaction data, financial instrument data, and/or processing data for past failed transactions. For example, the transaction data may include features and/or attributes that are extracted similar to a data features processed when determining when to execute a retry of a failed transaction. The training data may therefore include information about the underlying transactions that failed, such as items in the transactions, costs or fees for the transaction, transaction description, merchant information for merchants in the transaction, and/or user information for users purchasing items in the transactions. Further, the training data may include features associated with the credit card or other financial instrument processed in the transaction, and how the financial instrument was conveyed to the backend processing gateways and networks for the financial instrument. For example, the training data may include financial instrument and/or account numbers, authentication data (e.g., a PIN, card verification code, etc.), billing information and address, selected card or instrument processor, network tokens and/or data communications, encryption parameters and/or keys, and the like.

The training data may further include retry success features, attributes, and/or designations, such as if the past failed transactions were successful on retry, unsuccessful, and the features of those retry attempts. At step 404, a machine learning (ML) model for predictive retry attempt likelihood is trained using the training data. Prior to training, feature extraction may be used to extract those features and/or attributes required for ML model training, such as features used to predict retry success likelihood and/or usable with the corresponding ML algorithm. The ML algorithm may be selected such as a Light GBM model, an XG Boost model, a random forest model, or a tree-based algorithm model. Once features are extracted and a ML algorithm is selected, the ML model may be trained and feedback may be used to adjusted the trained nodes and layers for the ML model.

At step 406, the ML model is deployed with a cost function for an electronic transaction processing system. The ML model may be deployed with a model server that performs intelligent decision-making for retry attempts of failed transactions. The cost function that is deployed with the ML model may correspond to a function to determine a cost for retrying the failed transaction and a cost for stopping the retrying of the failed transaction (e.g., based on lost revenue and the like). The cost function may include predetermined variables and/or coefficients, such as based on cost, that may be adjusted. Similarly, feature variables for the ML model may also be adjusted if needed after deployment.

At step 408, a transaction that has resulted in a transaction processing failure with a card processor is detected. The transaction may have failed due to a data processing error, failure of a process or component, and/or network communication issue during transaction processing. This may occur when processing the transaction with a card processing system having the card processor, such as a backend card processing gateway and/or network. At step 410, a predictive score for a likelihood of retry success when retrying the transaction with a card processor is determined. The predictive score may be determined by extracting features from the failed transaction and using those features as input for the ML model, such as retry success features and/or attributes. The predictive score may further correspond to a probability or likelihood of the failed transaction being successful if retried with the card processor or a secondary card processor for the card processing system.

At step 412, a cost to retry the transaction is calculated based on the predictive score. For example, the cost may be calculated using the equations and formulas discussed herein, or other cost functions, which may determine a cost to retry the transaction after the failure. The cost may be compared to a cost to stop a retry attempt of processing the transaction. At step 414, it is determined whether the predictive score exceeds a threshold required for retrying processing of the transaction. Step 414 may include comparing the costs to determine if the cost to retry the transaction after failure is less than, or equal to, the cost to stop retrying of processing of the transaction.

If the cost to retry meets or exceeds the cost to stop the retry, or otherwise the predictive score does not meet or exceed the threshold at step 414, the transaction is not retried and a failure is output, at step 416. If the cost is less than or equal to, or otherwise the predictive score meets or exceeds the threshold probability for retrying processing of the failed transaction, then step 414 proceeds to step 418 instead and the transaction is retried. This may include resubmitting the transaction for processing to the same card processor, or instead the transaction may be retried with another card processor, such as a secondary card processor. Depending on the results from step 416 or 418, flowchart 400 proceeds to step 420, where the cost function is updated. The cost function may be updated based on changes to analytics and additional transaction failures and retries, as well as other assessment fees and incurred costs.

Figure 5:
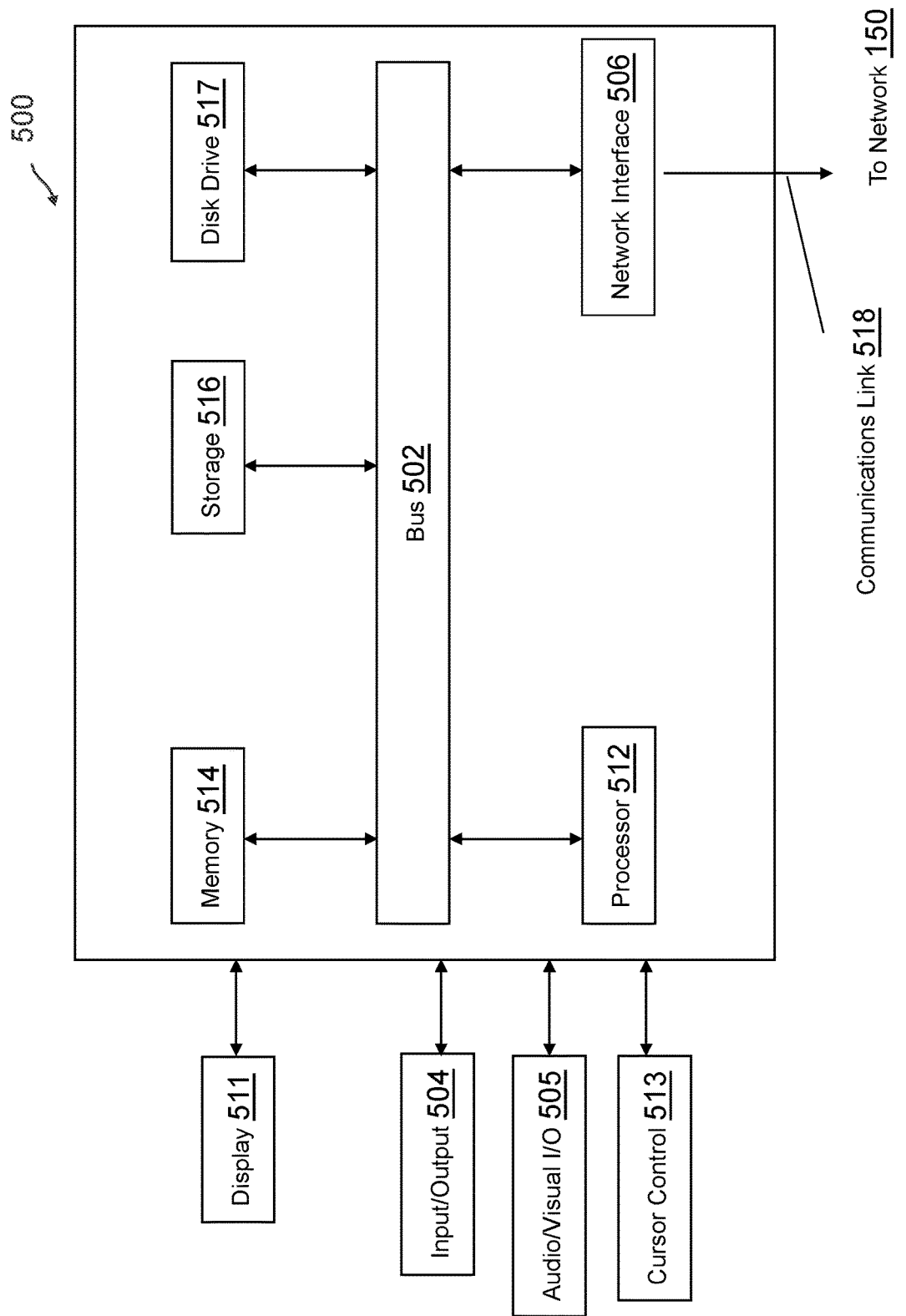
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A transaction processor system comprising:
a non-transitory memory; and
one or more hardware processors coupled to the non-transitory memory and configured to read instructions from the non-transitory memory to cause the transaction processor system to perform operations comprising:

monitoring, over a network, processing of a plurality of transactions between the transaction processor system and a backend processing gateway;
detecting that a first transaction of the plurality of transactions has resulted in a transaction processing failure during a data processing of the first transaction over the network with a first card processor of the backend processing gateway, wherein the first transaction includes transaction data associated with a user and a merchant and financial instrument data for a financial instrument used with the first transaction;
extracting, from the transaction data and the financial instrument data, feature data for one or more retry success features of a machine learning (ML) model;
determining a second card processor available for the data processing of the first transaction with the transaction processor system, wherein the second card processor is associated with a set of card processor features for the ML model;
determining, using the ML model and based on the feature data, the one or more retry success features, and the set of card processor features, a predictive score for a success of a retry attempt of the first transaction with the second card processor;
determining system resources utilized for an execution of the retry attempt of the first transaction with the second card processor in place of the first card processor, wherein the system resources are associated with at least one of a data processor resource or a network resource;
calculating a first cost of the retry attempt based on the system resources utilized for the execution and the predictive score, wherein the first cost identifies the system resources used by the execution of the retry attempt, and wherein the predictive score attributes a quantitative value to the success of the retry attempt;
calculating an abandonment cost of the first transaction based on an expected loss incurred by abandoning the first transaction after the transaction processing failure;
comparing, using one or more executable operations for a cost function, the first cost of the retry attempt to the abandonment cost of the first transaction, wherein the cost function balances the system resources used by the execution of the retry attempt with the second card processor based on the quantitative value;
determining whether to execute the retry attempt of the first transaction with the second card processor based on the comparing and a retry success threshold that prevents the retry attempt from meeting or exceeding an allowable resource usage cost; and
reducing a processing load on the second card processor caused by processing the retry attempt or one or more subsequent retry attempts wherein the reducing the processing load comprises:
determining a cost comparison indicating that the abandonment cost meets or exceeds the first cost of the retry attempt or one or more further costs of the one or more subsequent retry attempts,
determining a cost attribution indicating a resource usage cost attributable to the retry attempt or the one or more subsequent retry attempts is less than or equal to a threshold for retry attempt resource usage, and performing the processing of the retry attempt or the one or more subsequent retry attempts based on the cost comparison and the cost attribution.

2. The transaction processor system of claim 1, wherein prior to the monitoring, the operations further comprise:
training the ML model using training feature data extracted from training data associated with past transaction processing failures by the transaction processor system.

3. The transaction processor system of claim 2, wherein prior to the training the ML model, the operations further comprise:
receiving the training data for the ML model;
extracting the training feature data for the ML model from the past transaction processing failures of the training data; and
performing a feature transformation of the training feature data.

4. The transaction processor system of claim 3, wherein the training data further comprises a designation of whether each of the past transaction processing failures was successful when retried with a card acquirer processing system, and wherein the training feature data is extracted based at least on the designation of whether each of the past transaction processing failures was successful when retried.

5. The transaction processor system of claim 1, wherein the retry success threshold is based on an unsuccessful retry cost for usage of the system resources if a failure of the retry attempt occurs, and wherein the determining whether to execute the retry attempt of the first transaction comprises:
determining a successful retry cost of the success of the retry attempt using an assessment fee for the retry attempt and the cost function; and
comparing the successful retry cost to the unsuccessful retry cost for the allowable resource usage cost.

6. The transaction processor system of claim 5, wherein the determining whether to execute the retry attempt of the first transaction further comprises:
determining the unsuccessful retry cost of the failure of the retry attempt using the assessment fee, a lost revenue from preventing the retry attempt, and the cost function.

7. The transaction processor system of claim 5, wherein the operations further comprise:
determining a model performance of the ML model over a time period; and
updating the cost function based on the model performance.

8. The transaction processor system of claim 1, wherein the retry attempt is performed with a card acquirer processing system corresponding to the backend processing gateway that comprises the first card processor executed by a first computing system and the second card processor executed by a second computing system, wherein the transaction processing failure of the first transaction occurs with the first card processor, and wherein the retry attempt is designated for the second card processor executed by the second computing system.

9. The transaction processor system of claim 1, wherein the ML model uses one of a Light GBM model, an XG Boost model, a random forest model, or a tree-based algorithm model.

10. The transaction processor system of claim 1, wherein the one or more retry success features are further associated with at least one of a network token for a network communication with a card acquirer processing system for the retry attempt, acquirer information for the card acquirer processing system, or merchant information for the merchant.

11. A method comprising: monitoring, over a network, a processing of a plurality of transactions between a transaction processor system and a backend processing gateway; detecting that a first transaction of the plurality of transactions has resulted in a transaction processing failure during a data processing of the first transaction over the network with a first card processor of the backend processing gateway, wherein the first transaction includes transaction data associated with a user and a merchant and financial instrument data for a financial instrument used with the first transaction; extracting, from the transaction data and the financial instrument data, feature data for one or more retry success features of a machine learning (ML) model; determining a second card processor available for the data processing of the first transaction with the transaction processor system, wherein the second card processor is associated with a set of card processor features for the ML model; determining, using the ML model and based on—the feature data$_1$ the one or more retry success features, and the set of card processor features, a predictive score for a success of a retry attempt of the first transaction with the second card processor; determining system resources utilized for an execution of the retry attempt of the first transaction with the second card processor in place of the first card processor, wherein the system resources are associated with at least one of a data processor resource or a network resource; calculating a first cost of the retry attempt based on the system resources utilized for the execution and the predictive score, wherein the first cost identifies the system resources used by the execution of the retry attempt, and wherein the predictive score attributes a quantitative value to the success of the retry attempt; calculating an abandonment cost of the first transaction based on an expected loss incurred by abandoning the first transaction after the transaction processing failure; comparing, using one or more executable operations for a cost function, the first cost of the retry attempt to the abandonment cost of the first transaction, wherein the cost function balances the system resources used by the execution of the retry attempt with the second card processor based on the quantitative value; determining whether to execute the retry attempt of the first transaction with the second card processor based on the comparing and a retry success threshold that prevents the retry attempt from meeting or exceeding an allowable resource usage cost; and
reducing a processing load on the second card processor caused by processing the retry attempt or one or more subsequent retry attempts wherein the reducing the processing load comprises:
determining a cost comparison indicating that the abandonment cost meets or exceeds the first cost of the retry attempt or one or more further costs of the one or more subsequent retry attempts,
determining a cost attribution indicating a resource usage cost attributable to the retry attempt or the one or more subsequent retry attempts is less than or equal to a threshold for retry attempt resource usage, and
performing the processing of the retry attempt or the one or more subsequent retry attempts based on the cost comparison and the cost attribution.

12. The method of claim 11, wherein prior to the monitoring, the method further comprises:

training the ML model using training feature data extracted from training data associated with past transaction processing failures by the transaction processor system.

13. The method of claim 12, wherein prior to the training the ML model, the method further comprises:
receiving the training data for the ML model;
extracting the training feature data for the ML model from the past transaction processing failures of the training data; and
performing a feature transformation of the training feature data.

14. The method of claim 13, wherein the training data further comprises a designation of whether each of the past transaction processing failures was successful when retried with a card acquirer processing system, and wherein the training feature data is extracted based at least on the designation of whether each of the past transaction processing failures was successful when retried.

15. The method of claim 11, wherein the retry success threshold is based on an unsuccessful retry cost for usage of the system resources if a failure of the retry attempt occurs, and wherein the determining whether to execute the retry attempt of the first transaction comprises:
determining a successful retry cost of the success of the retry attempt using an assessment fee for the retry attempt and the cost function; and
comparing the successful retry cost to the unsuccessful retry cost for the allowable resource usage cost.

16. The method of claim 15, wherein the determining whether to execute the retry attempt of the first transaction further comprises:
determining the unsuccessful retry cost of the failure of the retry attempt using the assessment fee, a lost revenue from preventing the retry attempt, and the cost function.

17. The method of claim 15, further comprising:
determining a model performance of the ML model over a time period; and
updating the cost function based on the model performance.

18. The method of claim 11, wherein the retry attempt is performed with a card acquirer processing system corresponding to the backend processing gateway that comprises the first card processor executed by a first computing system and the second card processor executed by a second computing system, wherein the transaction processing failure of the first transaction occurs with the first card processor, and wherein the retry attempt is designated for the second card processor executed by the second computing system.

19. The method of claim 11, wherein the ML model uses one of a Light GBM model, an XG Boost model, a random forest model, or a tree-based algorithm model.

20. A non-transitory machine-readable medium having stored thereon machine-readable instructions executable to cause a machine to perform operations comprising: monitoring, over a network, processing of a plurality of transactions between a transaction processor system and a backend processing gateway; detecting that a first transaction of the plurality of transactions has resulted in a transaction processing failure during a data processing of the first transaction over the network with a first card processor of the backend processing gateway, wherein the first transaction includes transaction data associated with a user and a merchant and financial instrument data for a financial instrument used with the first transaction; extracting, from the transaction data and the financial instrument data, feature data for one or more retry success features of a machine learning (ML) model; determining a second card processor available for the data processing of the first transaction with the transaction processor system, wherein the second card processor is associated with a set of card processor features for the ML model; determining, using the ML model and based on the feature data, the one or more retry success features, and the set of card processor features, a predictive score for a success of a retry attempt of the first transaction with the second card processor; determining system resources utilized for an execution of the retry attempt of the first transaction with the second card processor in place of the first card processor, wherein the system resources are associated with at least one of a data processor resource or a network resource; calculating a first cost of the retry attempt based on the system resources utilized for the execution and the predictive score, wherein the first cost identifies the system resources used by the execution of the retry attempt, and wherein the predictive score attributes a quantitative value to the success of the retry attempt; calculating an abandonment cost of the first transaction based on an expected loss incurred by abandoning the first transaction after the transaction processing failure; comparing, using one or more executable operations for a cost function, the first cost of the retry attempt to the abandonment cost of the first transaction, wherein the cost function balances the system resources used by the execution of the retry attempt with the second card processor based on the quantitative value; determining whether to execute the retry attempt of the first transaction with the second card processor based on the comparing and a retry success threshold that prevents the retry attempt from meeting or exceeding an allowable resource usage cost; and
reducing a processing load on the second card processor caused by processing the retry attempt or one or more subsequent retry attempts wherein the reducing the processing load comprises:
determining a cost comparison indicating that the abandonment cost meets or exceeds the first cost of the retry attempt or one or more further costs of the one or more subsequent retry attempts,
determining a cost attribution indicating a resource usage cost attributable to the retry attempt or the one or more subsequent retry attempts is less than or equal to a threshold for retry attempt resource usage, and
performing the processing of the retry attempt or the one or more subsequent retry attempts based on the cost comparison and the cost attribution.

* * * * *

UNITED STATES PATENT AND TRADEMARK OFFICE
CERTIFICATE OF CORRECTION

PATENT NO. : 12,346,891 B2  
APPLICATION NO. : 17/369537  
DATED : July 1, 2025  
INVENTOR(S) : Aditya Jain et al.

Page 1 of 1

It is certified that error appears in the above-identified patent and that said Letters Patent is hereby corrected as shown below:

In the Claims

Claim 11, Column 22, Lines 20-21, change "and based on—the feature $data_1$ the" to --and based on the feature data, the--.

Signed and Sealed this  
Nineteenth Day of August, 2025

Coke Morgan Stewart  
*Acting Director of the United States Patent and Trademark Office*